United States Patent
Wang et al.

(10) Patent No.: US 12,010,310 B2
(45) Date of Patent: Jun. 11, 2024

(54) METHOD AND APPARATUS FOR QUANTIZATION, ADAPTIVE BLOCK PARTITIONING AND CODEBOOK CODING FOR NEURAL NETWORK MODEL COMPRESSION

(71) Applicant: TENCENT AMERICA LLC, Palo Alto, CA (US)

(72) Inventors: Wei Wang, Palo Alto, CA (US); Wei Jiang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 224 days.

(21) Appl. No.: 17/559,676

(22) Filed: Dec. 22, 2021

(65) Prior Publication Data

US 2022/0116610 A1 Apr. 14, 2022

Related U.S. Application Data

(63) Continuation of application No. 17/099,202, filed on Nov. 16, 2020, now Pat. No. 11,245,903.

(Continued)

(51) Int. Cl.
*H04N 19/13* (2014.01)
*G06N 3/08* (2023.01)
(Continued)

(52) U.S. Cl.
CPC ............ *H04N 19/124* (2014.11); *G06N 3/08* (2013.01); *H04N 19/119* (2014.11);
(Continued)

(58) Field of Classification Search
CPC .... H04N 19/124; H04N 19/119; H04N 19/13; H04N 19/147; H04N 19/176;
(Continued)

(56) References Cited

U.S. PATENT DOCUMENTS

| 2016/0217369 A1 | 7/2016 | Annapureddy et al. |
| 2017/0076196 A1 | 3/2017 | Sainath et al. |

(Continued)

FOREIGN PATENT DOCUMENTS

| JP | 2016-514931 A | 5/2016 |
| WO | 2020/190772 A1 | 9/2020 |

OTHER PUBLICATIONS

Office Action dated Jan. 4, 2023 in Japanese Application No. 2021-559625.

(Continued)

*Primary Examiner* — Dave Czekaj
*Assistant Examiner* — Berteau Joisil
(74) *Attorney, Agent, or Firm* — Sughrue Mion, PLLC

(57) ABSTRACT

A method of quantization, adaptive block partitioning and codebook coding for neural network model compression, is performed by at least one processor and includes determining a saturated maximum value of a multi-dimensional tensor in a layer of a neural network, and a bit depth corresponding to the saturated maximum value, and clipping weight coefficients in the multi-dimensional tensor to be within a range of the saturated maximum value. The method further includes quantizing the clipped weight coefficients, based on the bit depth, and transmitting, to a decoder, a layer header including the bit depth.

20 Claims, 13 Drawing Sheets

Related U.S. Application Data

(60) Provisional application No. 62/939,949, filed on Nov. 25, 2019, provisional application No. 62/939,054, filed on Nov. 22, 2019, provisional application No. 62/939,057, filed on Nov. 22, 2019.

(51) Int. Cl.

| | |
|---|---|
| *H04N 19/119* | (2014.01) |
| *H04N 19/124* | (2014.01) |
| *H04N 19/147* | (2014.01) |
| *H04N 19/176* | (2014.01) |
| *H04N 19/192* | (2014.01) |
| *H04N 19/30* | (2014.01) |
| *H04N 19/46* | (2014.01) |
| *H04N 19/597* | (2014.01) |
| *H04N 19/96* | (2014.01) |

(52) U.S. Cl.
CPC ............ *H04N 19/13* (2014.11); *H04N 19/147* (2014.11); *H04N 19/176* (2014.11); *H04N 19/192* (2014.11); *H04N 19/30* (2014.11); *H04N 19/46* (2014.11); *H04N 19/597* (2014.11); *H04N 19/96* (2014.11)

(58) Field of Classification Search
CPC ...... H04N 19/192; H04N 19/30; H04N 19/46; H04N 19/597; H04N 19/96; G06N 3/08
See application file for complete search history.

(56) References Cited

U.S. PATENT DOCUMENTS

| | | |
|---|---|---|
| 2018/0176578 A1 | 6/2018 | Rippel et al. |
| 2019/0327479 A1 | 10/2019 | Chen et al. |
| 2019/0347550 A1 | 11/2019 | Jung et al. |
| 2019/0370658 A1 | 12/2019 | Xie et al. |
| 2020/0311551 A1 | 10/2020 | Aytekin et al. |

OTHER PUBLICATIONS

Benoit Jacob et al., "Quantization and Training of Neural Networks for Efficient Integer-Arithmetic-Only Inference", 2018 IEEE/CVF Conference on Computer Vision and Pattern Recognition, 2018, pp. 2704-2713 (10 pages total).

International Search Report dated Feb. 10, 2021 in International Application No. PCT/US2020/061258.

Written Opinion of the International Searching Authority dated Feb. 10, 2021 in International Application No. PCT/US2020/061258.

"Test model 2 of Compression of neural networks for multimedia content description and analysis", Video Subgroup, ISO/IEC JTC1/SC29/WG11/N18785, Oct. 31, 2019, 10 pages, Geneva, CH.

"Working Draft 2 of Compression of neural networks for multimedia content description and analysis", Video Subgroup, ISO/IEC JTC1/SC29/WG11/N18784, Oct. 31, 2019, 26 pages, Geneva, CH.

"Description of Core Experiments on Compression of neural networks for multimedia content description and analysis", Video Subgroup, ISO/IEC JTC 1/SC 29/WG 11, N 18782, Oct. 11, 2019, 14 pages, Geneva, CH.

Extended European Search Report dated Nov. 24, 2022 in European Application No. 20890921.8.

Al-Hami et al., "Methodologies of Compressing a Stable Performance Convolutional Neural Networks in Image Classification", Neural Processing Letters, 2020, vol. 51, pp. 105-127 (23 pages total).

METHOD AND APPARATUS FOR QUANTIZATION, ADAPTIVE BLOCK PARTITIONING AND CODEBOOK CODING FOR NEURAL NETWORK MODEL COMPRESSION

CROSS-REFERENCE TO RELATED APPLICATION

This application is a continuation of U.S. application Ser. No. 17/099,202, filed Nov. 16, 2020, which claims priority from U.S. Provisional Patent Application No. 62/939,057, filed on Nov. 22, 2019, U.S. Provisional Patent Application No. 62/939,054, filed on Nov. 22, 2019, and U.S. Provisional Patent Application No. 62/939,949, filed on Nov. 25, 2019, in the U.S. Patent and Trademark Office, the disclosures of which are incorporated herein by reference in their entireties.

BACKGROUND

Success of Deep Neural Networks (DNNs) in a large range of video applications such as semantic classification, target detection/recognition, target tracking, video quality enhancement, etc. poses a need for compressing DNN models. Therefore, the Motion Picture Experts Group (MPEG) is actively working on the Coded Representation of Neural Network standard (NNR) that is used to encode DNN models to save both storage and computation.

SUMMARY

According to embodiments, a method of quantization, adaptive block partitioning and codebook coding for neural network model compression, is performed by at least one processor and includes determining a saturated maximum value of a multi-dimensional tensor in a layer of a neural network, and a bit depth corresponding to the saturated maximum value, and clipping weight coefficients in the multi-dimensional tensor to be within a range of the saturated maximum value. The method further includes quantizing the clipped weight coefficients, based on the bit depth, and transmitting, to a decoder, a layer header including the bit depth.

According to embodiments, an apparatus for quantization, adaptive block partitioning and codebook coding for neural network model compression, includes at least one memory configured to store program code, and at least one processor configured to read the program code and operate as instructed by the program code. The program code includes first determining code configured to cause the at least one processor to determine a saturated maximum value of a multi-dimensional tensor in a layer of a neural network, and a bit depth corresponding to the saturated maximum value, and clipping code configured to cause the at least one processor to clip weight coefficients in the multi-dimensional tensor to be within a range of the saturated maximum value. The program code further includes quantizing code configured to cause the at least one processor to quantize the clipped weight coefficients, based on the bit depth, and transmitting code configured to cause the at least one processor to transmit, to a decoder, a layer header including the bit depth.

According to embodiments, a non-transitory computer-readable medium stores instructions that, when executed by at least one processor for quantization, adaptive block partitioning and codebook coding for neural network model compression, cause the at least one processor to determine a saturated maximum value of a multi-dimensional tensor in a layer of a neural network, and a bit depth corresponding to the saturated maximum value, and clip weight coefficients in the multi-dimensional tensor to be within a range of the saturated maximum value. The instructions, when executed by the at least one processor, further cause the at least one processor to quantize the clipped weight coefficients, based on the bit depth, and transmit, to a decoder, a layer header including the bit depth.

DETAILED DESCRIPTION

Figure 1A:
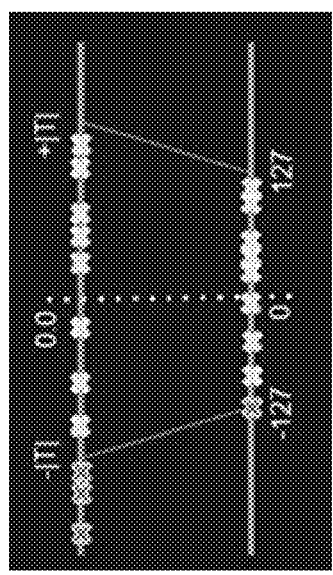
FIG. 1A is a diagram of clipping and mapping coefficients to an 8-bit representation.

This disclosure is related to neural network model compression. To be more specific, methods and apparatuses described herein are related to quantization, adaptive block partitioning and codebook coding for neural network model compression.

In the compression of neural networks for multimedia content description and analysis, if a dimension of a weight tensor is more than two (such as a convolution layer), this weight tensor is reshaped to a two-dimensional (2D) tensor. No reshape is performed if the dimension of weight tensor is no more than two (such as a fully connected layer or a bias layer).

The encoding method scans weight coefficients in a row-first manner from left to right and scans rows from top to bottom.

```
quant_weight_tensor( dimensions, maxNumNoRem ) {
    dim = Size( dimensions )
    for( i = TensorIterator( dim );!TensorIteratorEnd( i, dimensions ); i = TensorIteratorNext( i, dimensions ) )
    {
        quant_weight( i, maxdNumNoRem )
    }
}
```

In the compression of neural networks for multimedia content description and analysis, nearest neighbor quantization is applied in a uniform way to each weight coefficient in weight matrices. A fixed step size is applied. Reconstructed values in a decoded matrix are integer multiples of the step size. The step size is defined as a 32-bit floating number.

```
step_size( ) {
    step_size          flt(32)
}
``` step_size is the quantization step size.

In the compression of neural networks for multimedia content description and analysis, each quantized weight level is encoded according to the following procedure employing an integer parameter maxNumNoRem:

In a first step, a binary syntax element sig flag is encoded for the quantized weight level, which specifies whether a corresponding level is equal to zero. If the sig flag is equal to one, a further binary syntax element sign_flag is encoded. A bin indicates if a current weight level is positive or negative. Next, a unary sequence of bins is encoded, followed by a fixed length sequence as follows:

A variable k is initialized with zero and X is initialized with 1<<k. A syntax element abs level greater_X is encoded, which indicates that an absolute value of the quantized weight level is greater than X. If abs level greater_X is equal to 1 and if X is greater than maxNumNoRem, the variable k is increased by 1. Afterwards, 1<<k is added to X and a further abs_level_greater_X is encoded. This procedure is continued until an abs_level_greater_X is equal to 0. Now, X must be one of values (X, X−1, . . . X−(1<<k)+1). A code of length k is encoded, which points to values in a list that is an absolute quantized weight level.

Context modeling corresponds to associating three type of flags sig flag, sign_flag, and abs_level_greater_X with context models. In this way, flags with similar statistical behavior may be associated with the same context model so that a probability estimator (inside of the context model) can adapt to underlying statistics.

The context modeling of the presented approach is as follows:

Three context models are distinguished for the sig flag, depending on whether a neighboring quantized weight level to the left is zero, smaller than zero, or larger than zero.

Three other context models are distinguished for the sign_flag depending on whether the neighboring quantized weight level to the left is zero, smaller than zero, or larger than zero.

For the abs_level_greater_X flags, each X uses, either one or two separate context models. If X<=maxNumNoRem, two context models are distinguished depending on the sign flag. If X>maxNumNoRem, only one context model is used.

```
quant_weight( i, maxNumNoRem ) {
    QuantWeight[i] = 0
```

-continued

```
    sig_flag                                      ae(v)
    if( sig_flag ) {
        QuantWeight[i]++
        sign_flag                                 ae(v)
        j = −1
        do {
            j++
            abs_level_greater_x[j]                ae(v)
            QuantWeight[i] +=
            abs_level_greater_x[j]
        } while( abs_level_greater_x[j] == 1 &&
        j < maxNumNoRem )
        if( j == maxNumNoRem ) {
            RemBits = 0
            j = −1
            do {
                j++
                abs_level_greater_x2[j]           ae(v)
                if( abs_level_greater_x2[j] ) {
                    RemBits++
                    QuantWeight[i] += 1 <<
                    RemBits
                }
            } while( abs_level_greater_x2[j] )
            abs_remainder                         uab(RemBits)
            QuantWeight[i] += abs_remainder
        }
        QuantWeight[i] = sign_flag ?
        −QuantWeight[i] :
            QuantWeight[i]
    }
}
``` sig_flag specifies whether a quantized weight QuantWeight[i] is nonzero. A sig_flag equal to 0 indicates that QuantWeight[i] is zero.

sign_flag specifies whether the quantized weight QuantWeight[i] is positive or negative. A sign_flag equal to 1 indicates that QuantWeight[i] is negative.

abs_level_greater_x[j] indicates whether an absolute level of QuantWeight[i] is greater j+1.

abs_level_greater_x2[j] includes an unary part of an exponential golomb remainder.

abs_remainder indicates a fixed length remainder.

In the current NNR, a step size is defined as a 32-bit floating number. A decoder does not have any knowledge of a maximum bit depth of quantized coefficients before decoding of a current layer is completed. This forces the decoder to allocate memory for a quantized coefficient with a maximum possible bit depth (such as 32-bit), wasting memory usage, bandwidth and inference speed.

Figure 1B:
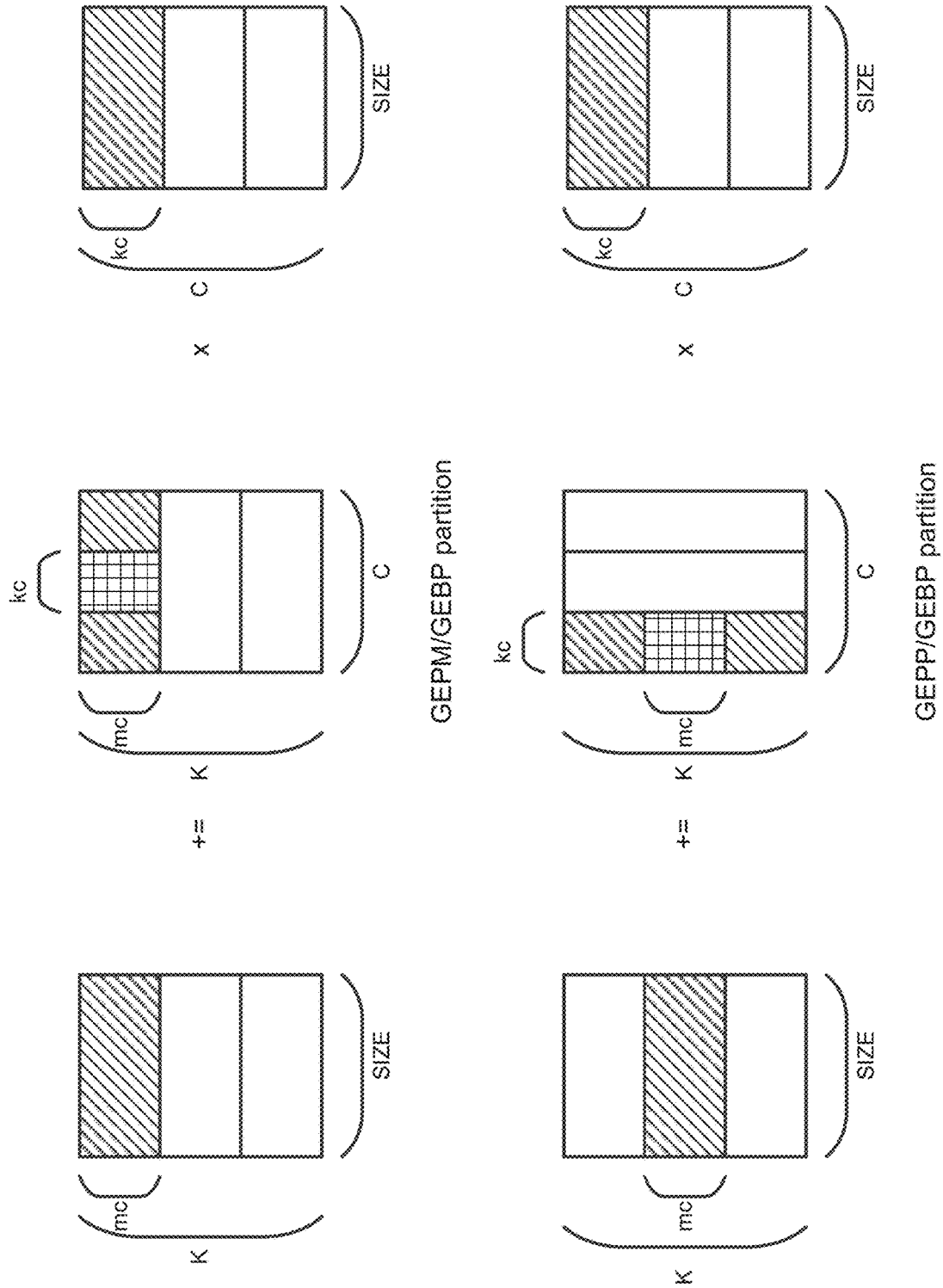
FIG. 1B is a diagram of a GEPM/GEPP partition method.

Further, inference operation for deep learning system uses matrix multiplication intensively so a high-performance matrix multiplication library (GEMM) is the key for inference operation. Depending on a size of a left-hand-side (lhs) matrix and a right-hand-side (rhs) matrix, two GEMM routines (GEPP/GEBP, GEPM/GEBP) are recognized by the industry over the last decade as the optimal GEMM solution. As shown in FIG. 1B, both methods partition the lhs matrix and the rhs matrix recursively to make the best use of different characteristics of off-chip memory (such as Double Data Rate (DDR)) and on-chip memory (such as multi-level cache) in modern computing platform, and the lhs matrix is usually stored in a column-major order to achieve the optimal memory access pattern. The lhs matrix is usually transposed to achieve the optimal memory access pattern. Some newer GEMM routines (such as QNNPACK) are optimized for neural networks designed for mobile and edge devices, are a variation of either a GEPP routine or a GEPM routine, and follow a similar matrix blocking/partitioning method.

A matrix scan order in the NNR is defined as a row-first manner from left to right and rows from top to bottom. This scan order does not match with a scan order required by the inference operation, as the inference operation must buffer an excessive size of weight coefficients before starts the operation. For example, when the inference operation is performed for a first fully-connect layer of VGG16, given that a matrix size of this layer is 25088×4096, a buffer that can store Nx25088 coefficients has to be reserved to perform a GEMM routine. If N=64 for a normal GEMM operation, a buffer size will be 1.5 MB even if coefficients are represented by an 8-bit integer instead of a 32-bit floating number, but such a buffer size is too high especially for mobile and edge devices.

Moreover, entropy coding may be performed on quantized weight coefficient directly. A local distribution after a weight tensor is partitioned to non-overlapping 2D/3D coding tree unit (CTU)/three-dimensional coding tree unit (CTU3D) blocks has not yet been considered. A codebook method offers more compact representation by re-indexing quantized weight coefficients in CTU/CTU3D blocks.

Figure 2:
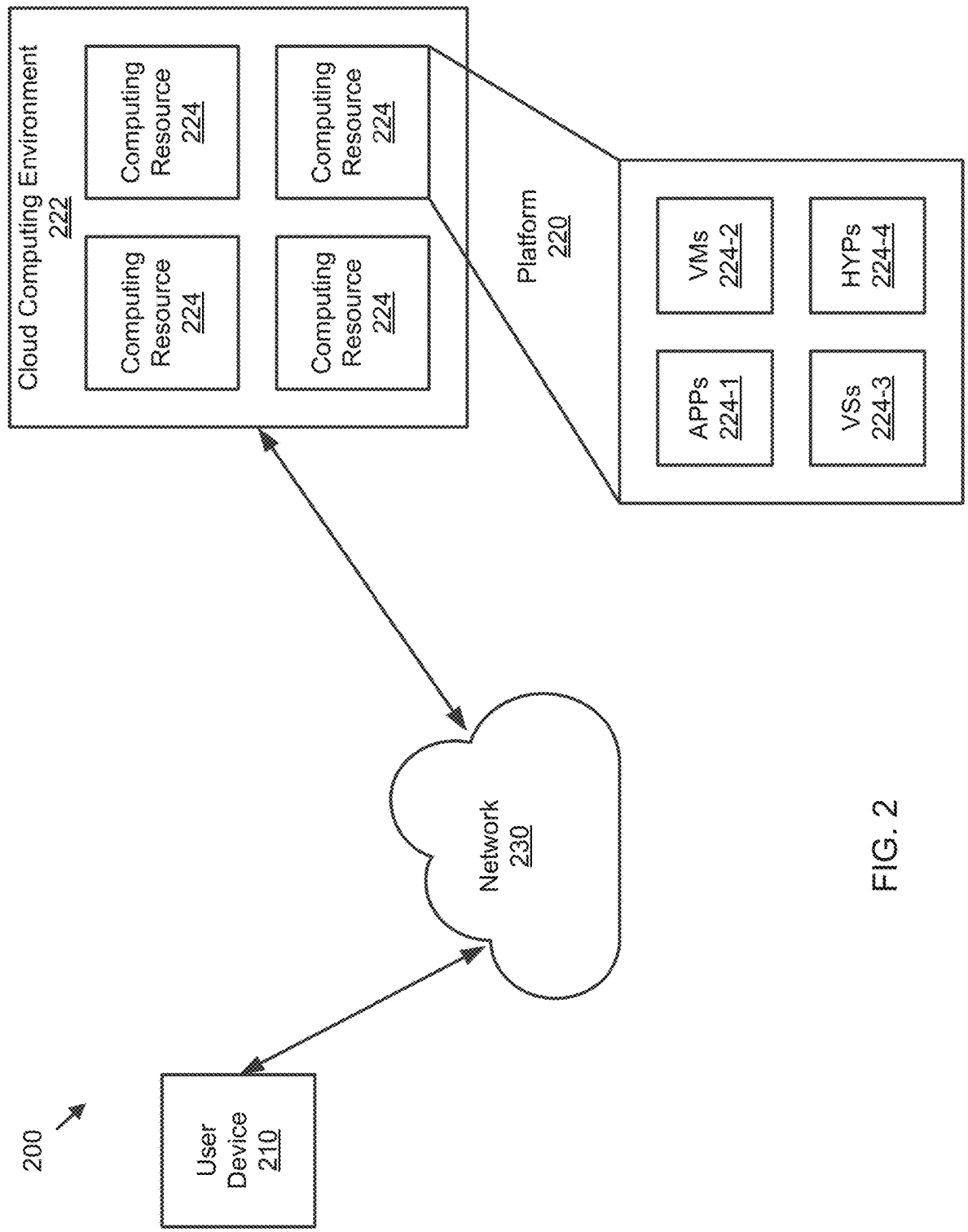
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
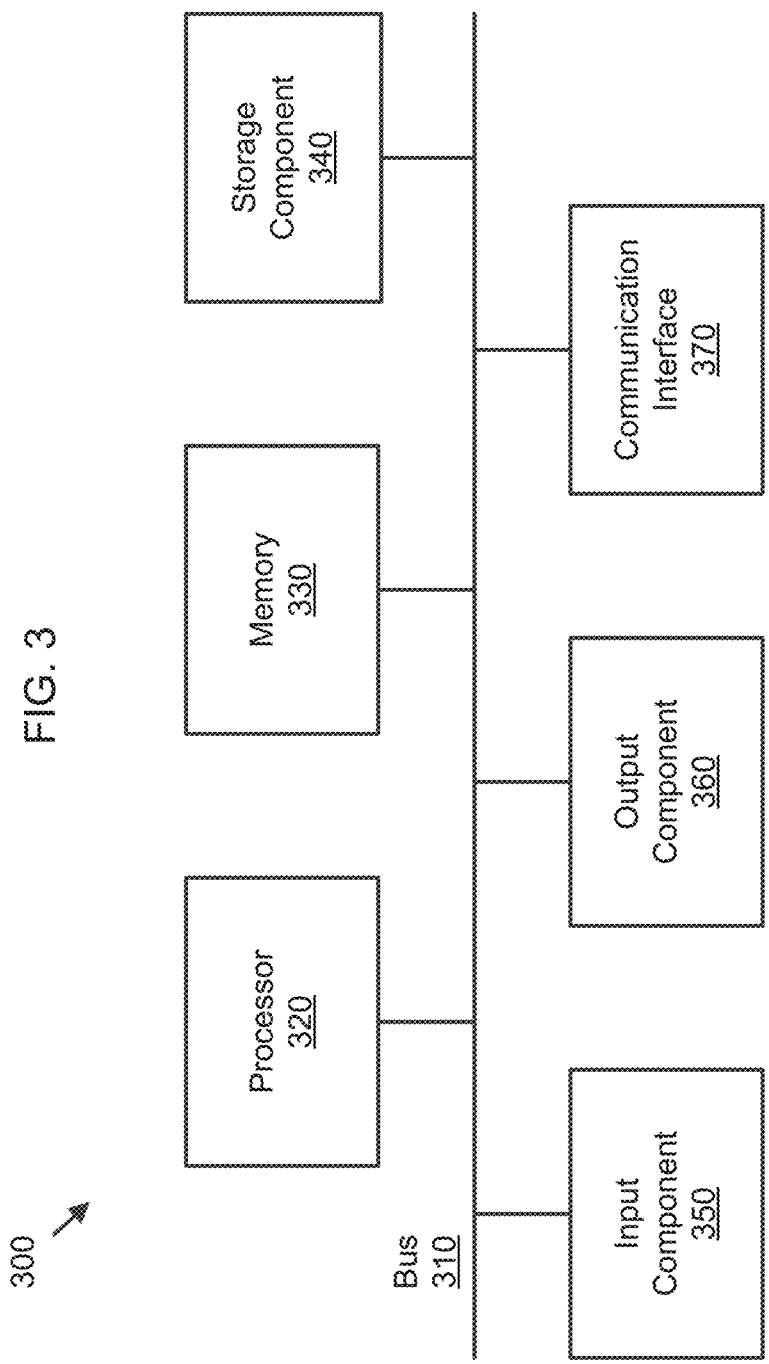
FIG. 3 is a block diagram of example components of one or more devices of FIG. 2.

FIG. 3 is a block diagram of example components of one or more devices of FIG. 2. The device 300 may correspond to the user device 210 and/or the platform 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
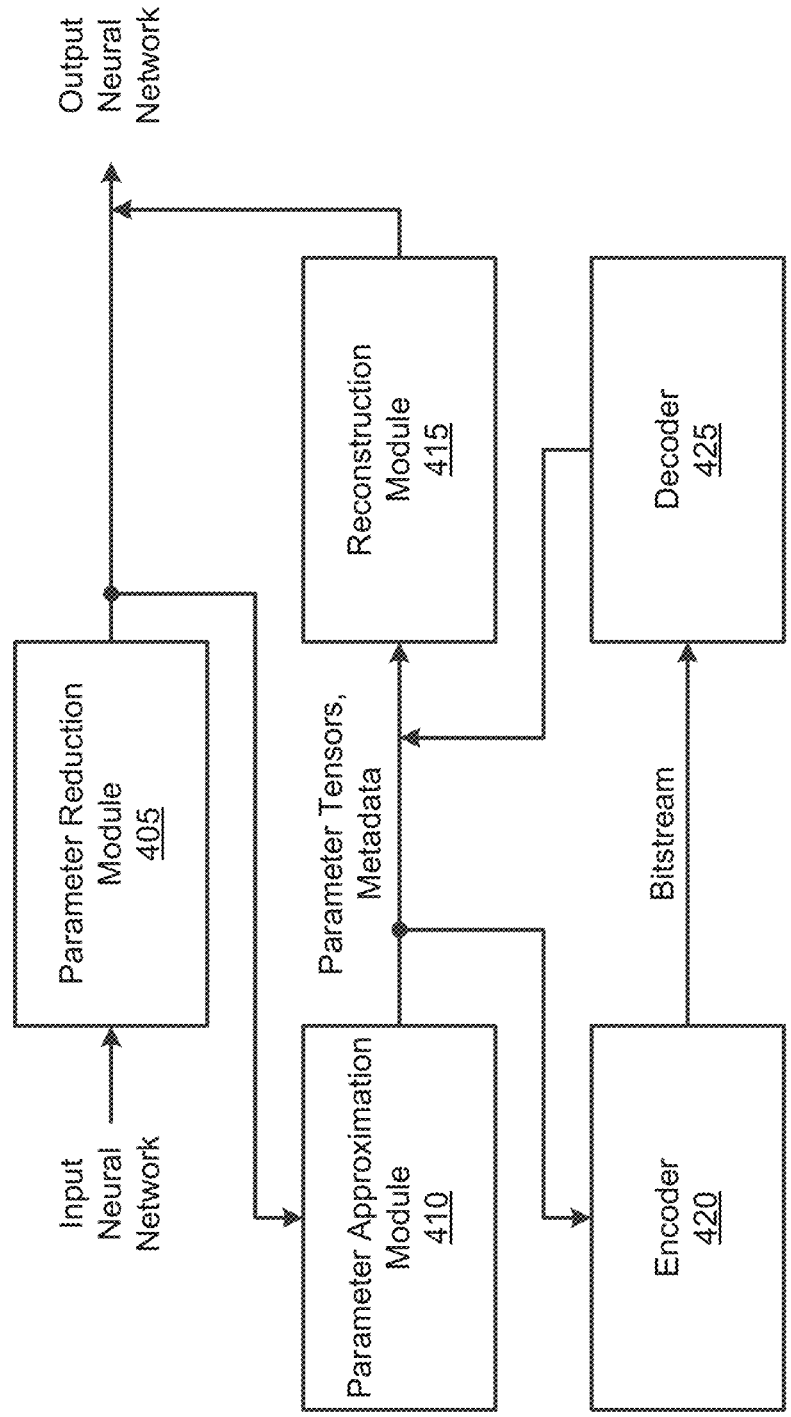
FIG. 4 is a functional block diagram of a system for neural network model compression, according to embodiments.

FIG. 4 is a functional block diagram of a system 400 for neural network model compression, according to embodiments.

As shown in FIG. 4, the system 400 includes a parameter reduction module 405, a parameter approximation module 410, a reconstruction module 415, an encoder 420, and a decoder 425.

The parameter reduction module 405 reduces a set of parameters of an input neural network, to obtain an output neural network. The neural network may include the parameters and an architecture as specified by a deep learning framework.

For example, the parameter reduction module 405 may sparsify (set weights to zero) and/or prune away connections of the neural network. In another example, the parameter reduction module 405 may perform matrix decomposition on parameter tensors of the neural network into a set of smaller parameter tensors. The parameter reduction module 405 may perform these methods in cascade, for example, may first sparsify the weights and then decompose a resulting matrix.

The parameter approximation module 410 applies parameter approximation techniques on parameter tensors that are extracted from the output neural network that is obtained from the parameter reduction module 405. For example, the techniques may include any one or any combination of quantization, transformation and prediction. The parameter approximation module 410 outputs first parameter tensors that are not modified by the parameter approximation module 410, second parameter tensors that are modified or approximated by the parameter approximation module 410, and respective metadata to be used to reconstruct original parameter tensors that are not modified by the parameter approximation module 410, from the modified second parameter tensors.

The reconstruction module 415 reconstructs the original parameter tensors from the modified second parameter tensors that are obtained from the parameter approximation module 410 and/or the decoder 425, using the respective metadata that is obtained from the parameter approximation module 410 and/or the decoder 425. The reconstruction module 415 may reconstruct the output neural network, using the reconstructed original parameter tensors and the first parameter tensors.

The encoder 420 may perform entropy encoding on the first parameter tensors, the second parameter tensors and the respective metadata that are obtained from the parameter approximation module 410. This information may be encoded into a bitstream to the decoder 425.

The decoder 425 may decode the bitstream that is obtained from the encoder 420, to obtain the first parameter tensors, the second parameter tensors and the respective metadata.

The system 400 may be implemented in the platform 220, and one or more modules of FIG. 4 may be performed by a device or a group of devices separate from or including the platform 220, such as the user device 210.

Methods and apparatuses for quantization for neural network model compression will now be described in detail.

A neural network weight distribution in a layer may follow a Gaussian distribution, in which a percentage of weight coefficients with a large value is very small but a maximum value of the weight coefficients is very large. An optimized quantization algorithm uses an algorithm such as Kullback-Leibler (KL) divergence to find an optimal saturated max value for a given bit depth. As shown in FIG. 1A, all weight coefficients are clipped to be within a range of the saturated max value, and after that, the modified weight coefficients are quantized (mapped) uniformly to an integer $[-(2^{}\text{bitdepth}-1), 2^{}\text{bitdepth}-1]$.

The saturated max value can be represented by its original 32-bit floating number, or can be transformed to an integer number while maintaining a N bit fractional accuracy. For example, an integer int_layer_sat_maxw of a saturated max value layer_sat_maxw can be calculated by the following equation:

$$\text{int\_layer\_sat\_max}w = \text{int}(\text{ceil}(\text{layer\_sat\_max}w * (2^{**}N))) \quad (1).$$

The ceil( ) function returns the smallest integer value that is larger than or equal to an input number.

A reconstructed saturated max value rec layer_sat_maxw can be calculated by the following equation:

$$\text{rec layer\_sat\_max}w = (\text{float})\text{int\_layer\_sat\_max}w / (2^{**}N) \quad (2).$$

In an embodiment, a bit depth of quantized weight coefficients is included in a layer header. The bit depth can be coded using either a variable length coding method or a fixed length coding method.

An example of a corresponding syntax table is listed below in Table 1:

TABLE 1

| layer_header( ) { | |
| --- | --- |
| ...... | |
| layer_stepsize | flt(32) |
| layer_bitdepth | |
| ...... | |
| } | | layer_stepsize indicates a quantization step size.

layer_bitdepth indicates a bit depth of a multi-dimension tensor in a layer.

In another embodiment, a bit depth of quantized weight coefficients is included in a layer header, and a quantization step size is replaced by a saturated max value. The saturated max value can be represented by an aforementioned floating or integer number. If the saturated max value is represented by an integer, the saturated max value can be coded using either a variable length coding method or a fixed length coding method.

An example of a corresponding syntax table is listed below in Table 2:

TABLE 2

| layer_header( ) { |
| --- |
| ...... |
| layer_sat_maxw |
| layer_bitdepth |
| ...... |
| } | layer_sat_maxw indicates a saturated max value of a multi-dimension tensor in a layer, in either an integer format or a float format.

layer_bitdepth indicates a bit depth of the multi-dimension tensor in the layer.

Figure 5:
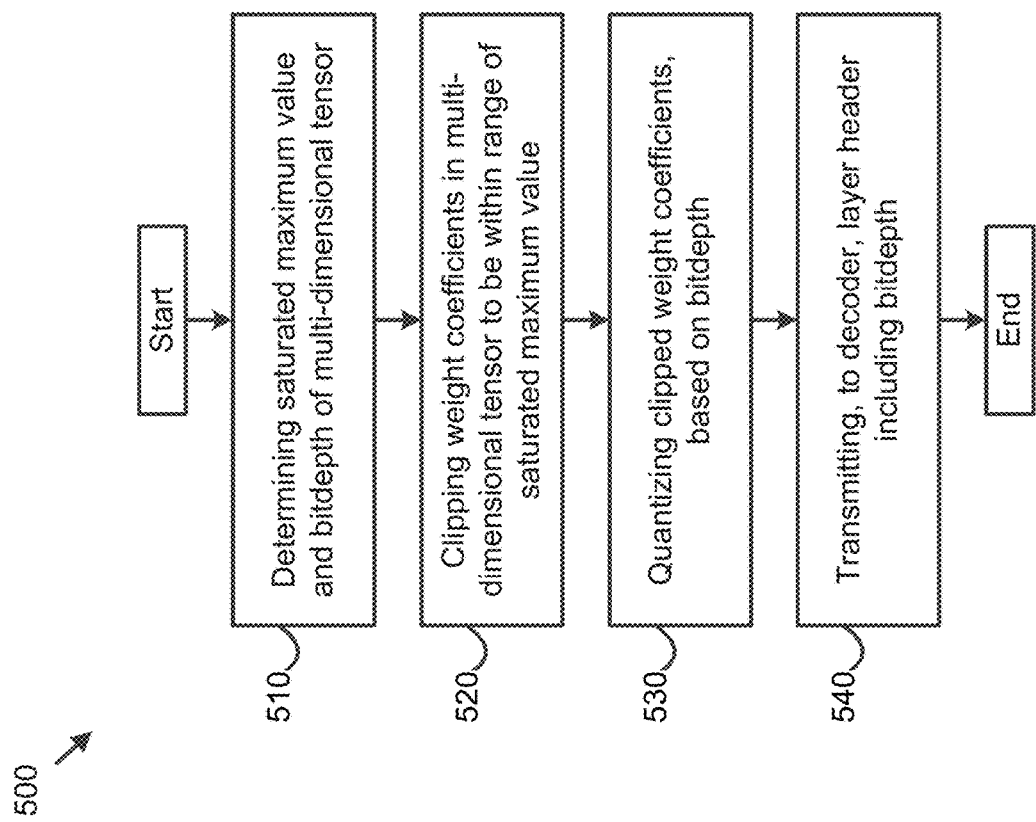
FIG. 5 is a flowchart of a method of quantization for neural network model compression, according to embodiments.

FIG. 5 is a flowchart of a method 500 of quantization for neural network model compression, according to embodiments. In some implementations, one or more operations of FIG. 5 may be performed by the platform 220. In some implementations, one or more operations of FIG. 5 may be performed by another device or a group of devices separate from or including the platform 220, such as the user device 210 and/or the encoder 420.

As shown in FIG. 5, in operation 510, the method 500 includes determining a saturated maximum value of a multi-dimensional tensor in a layer of a neural network, and a bit depth corresponding to the saturated maximum value.

In operation 520, the method 500 includes clipping weight coefficients in the multi-dimensional tensor to be within a range of the saturated maximum value.

In operation 530, the method 500 includes quantizing the clipped weight coefficients, based on the bit depth.

In operation 540, the method 500 includes transmitting, to a decoder, a layer header including the bit depth.

The method 500 may further include coding the bit depth, using a variable length coding or a fixed length coding. The layer header may include the coded bit depth.

The layer header may further include the saturated maximum value.

The saturated maximum value may be represented by a floating number.

The method 500 may further include determining an integer representing the saturated maximum value, based on Equation (1) above.

The method 500 may further include coding the integer of the saturated maximum value, using a variable length coding or a fixed length coding.

The layer header may further include a step size of the quantizing the clipped weight coefficients.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
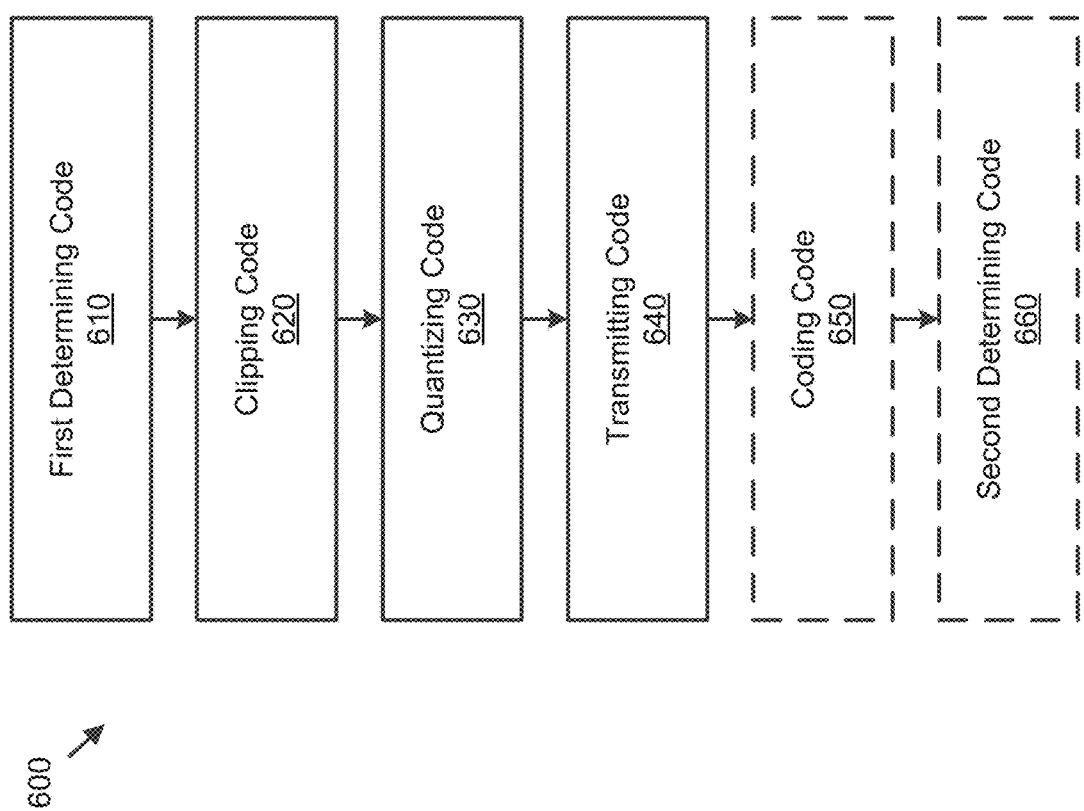
FIG. 6 is a block diagram of an apparatus for quantization for neural network model compression, according to embodiments.

FIG. 6 is a diagram of an apparatus 600 for quantization for neural network model compression, according to embodiments. In some implementations, one or more codes of FIG. 6 may be performed by the platform 220. In some implementations, one or more codes of FIG. 6 may be performed by another device or a group of devices separate from or including the platform 220, such as the user device 210 and/or the encoder 420.

As shown in FIG. 6, the apparatus 600 includes first determining code 610, clipping code 620, quantizing code 630 and transmitting code 640.

The first determining code 610 is configured to cause at least one processor of the apparatus 600 to determine a saturated maximum value of a multi-dimensional tensor in a layer of a neural network, and a bit depth corresponding to the saturated maximum value.

The clipping code 620 is configured to cause the at least one processor to clip weight coefficients in the multi-dimensional tensor to be within a range of the saturated maximum value.

The quantizing code 630 is configured to cause the at least one processor to quantize the clipped weight coefficients, based on the bit depth.

The transmitting code 640 is configured to cause the at least one processor to transmit, to a decoder, a layer header including the bit depth.

The apparatus 600 may further include coding code 650 configured to cause the at least one processor to code the bit depth, using a variable length coding or a fixed length coding. The layer header includes the coded bit depth.

The layer header may further include the saturated maximum value.

The saturated maximum value may be represented by a floating number.

The apparatus 600 may further include second determining code 660 configured to cause the at least one processor to determine an integer representing the saturated maximum value, based on Equation (1) above.

The coding code 650 may be further configured to cause the at least one processor to code the integer of the saturated maximum value, using a variable length coding or a fixed length coding.

The layer header may further include a step size of the quantizing the clipped weight coefficients.

Methods and apparatuses for adaptive block partitioning for neural network model compression will now be described in detail.

If an lhs tensor is stored in a column-major order, or after a transpose of a row-major tensor, a dimension of a weight tensor is usually 4 for a convolution layer with a layout of [R][S][C][K], 2 for a fully-connected layer with a layout of [C][K], and 1 for a bias and batch normal layer. R/S is a convolution kernel size, C is an input feature size and K is an output feature size.

In embodiments, for the convolution layer, a 2D [R][S] dimension is reshaped to an 1D [RS] dimension so that the four-dimensional (4D) tensor [R][S][C][K] is reshaped to a 3D tensor [RS][C][K]. The fully-connected layer is treated as a special case of the 3D tensor with R=S=1.

As the kernel size RS is usually much smaller than C/K, the 3D tensor [RS][C][K] is partitioned along a [C][K] plane with non-overlapping smaller blocks (CTU3D). Each CTU3D has a shape of [RS][ctu3d_height][ctu3d_width], where ctu3d_height=max_ctu3d_height, ctu3d_width= max_ctu3d_width, and max_ctu3d_height/max_ctu3d width is encoded in a model header. For a CTU3D that is located at the right and/or bottom of the tensor, its ctu3d_height is a remainder of C/max_ctu3d_height, and its ctu3d_width is a remainder of K/max_ctu3d_width.

In further embodiments, a square shape partition is used so that max_ctu3d_height=max_ctu3d_width, and a variable max_ctu3d_size is used to represent both max_ctu3d_height and max_ctu3d_width. max_ctu3d_size is defined as 2**N, and a value of N is 8, 16, 32, 64.

To facilitate an on-chip memory requirement in an inference operation, in embodiments, a flag is defined to indicate whether there is limit for a total CTU3D size for layers with different kernel sizes. The flag that equals to 0 indicates that ctu3d_height/ctu3d_width is kept unchanged regardless of the kernel size, and in this case, a size of a CTU3D for the convolution layer is RS times bigger than a size of a CTU3D for the fully-connected layer. The flag that equals to 1 indicates that ctu3d_height/ctu3d_width is scaled based on the kernel size. For example, ctu3d_height=ctu3d width=int (ctu3d_height*ctu3d width/R/S).

While any scan order can be used to scan and process CTU3Ds in a 3D tensor, in embodiments, they are scanned and processed using a raster scan order at either a horizontal direction (SCAN_CK) or a vertical direction (SCAN_KC).

An example of corresponding syntax tables is listed below in Tables 3-5:

TABLE 3

```
nnr( ) {
  ......
  layer_header( )
  if(enable_max_ctu3d_size){
    max_ctu3d_height= max_ctu3d_width=int(         embodiment
```

TABLE 3-continued

```
        max_ctu3d_size*max_ctu3d_size/R/S), or            1
        max_ctu3d_height= max_ctu3d_width=(2**(bitdepth(int(    embodiment
max_ctu3d_size *      max_ctu3d_size /R/S))-1)              2
    }
    if(layer_scan_order==SCAN_CK){
        for(c=0;c<C;c+=max_ctu3d_height){
            for(k=0;k<K;k+=max_ctu3d_width){
                ctu3d_height=min(max_ctu3d_height,C-c);
                ctu3d_width=min(max_ctu3d_width,K-k);
                last_ctu3d_flag=(max_ctu3d_height>=C-c &&
                    max_ctu3d_width>=K-k)?1:0
                ctu3d(c,k,ctu3d_height,ctu3d_width)
                end_of_layer(last_ctu3d_flag)
            }
        }
    }else if(layer_scan_order==SCAN_KC){
        for(k=0;k<K;k+=max_ctu3d_width){
            for(c=0;c<C;c+=max_ctu3d_height){
                ctu3d_height=min(max_ctu3d_height,C-c);
                ctu3d_width=min(max_ctu3d_width,K-k);
                last_ctu3d_flag=(max_ctu3d_height>=C-c &&
                    max_ctu3d_width>=K-k)?1:0
                ctu3d(c,k,ctu3d_height,ctu3d_width)
                end_of_layer(last_ctu3d_flag)
            }
        }
    }
    ......
}
```

TABLE 4

```
nnr_header( ) {
    ......
    enable_max_ctu3d_size
    max_ctu3d_idx
    ......
}
``` enable_max_ctu3d_size being 0 indicates that ctu3d height/ctu3d width is kept unchanged regardless of the kernel size, and enable_max_ctu3d_size being 1 indicates that ctu3d height/ctu3d width is scaled based on the kernel size.

max_ctu3d_idx is in the following equation:

$$max\_ctu\_3d\_size=(max\_ctu3d\_idx==0)?64: (max\_ctu3d\_idx==1)?32:(max\_ctu3d\_idx==2)?16:8 \quad (3)$$

TABLE 5

```
layer_header( ) {
    ......
    layer_scan_order
    ......
}
``` layer_scan_order being 0 indicates the raster scan order at a horizontal direction, and layer_scan_order being 1 indicates the raster scan order at a vertical direction.

In embodiments, a CTU/CU adaptive partitioning method that is used in video coding standards is used.

A simplified blocking structure is used, where a CTU3D/CU3D is partitioned to smaller CU3Ds recursively using a quad-tree structure until a maximum recursive depth is reached. Starting from a CTU3D node, this quad-tree of a CU3D is scanned and processed using a depth-first quad-tree scan order. Child nodes under the same parent node are scanned and processed using a raster scan order at either a horizontal direction or a vertical direction.

For a CU3D at a given quad-tree depth, a max cu3d height/max cu3d width of these CU3Ds is calculated using Equations (4) and (5) below, and a maximum recursive depth is reached when both max_cu3d_height and max_cu3d_width is smaller than or equal to a predefined threshold. This threshold can either be included in a bitstream explicitly, or can be a predefined number (such as 8) so it can be inferred by a decoder implicitly.

$$max\_cu3d\_height=max\_ctu3d\_height>>depth \quad (4)$$

$$max\_cu3d\_width=max\_ctu3d\_width>>depth \quad (5)$$

In further embodiments, a square shape partition is used so that max_ctu3d_height=max_ctu3d width. For a CU3D at a given quad-tree depth, a max_cu3d_size of these CU3Ds is calculated using Equation (4) below, and a maximum recursive depth is reached when max_cu3d_size is smaller than or equal to a predefined threshold. This threshold can either be included in a bitstream explicitly, or can be a predefined number (such as 8) so it can be inferred by a decoder implicitly.

$$max\_cu3d\_size=max\_ctu3d\_size>>depth \quad (6)$$

Figure 7:
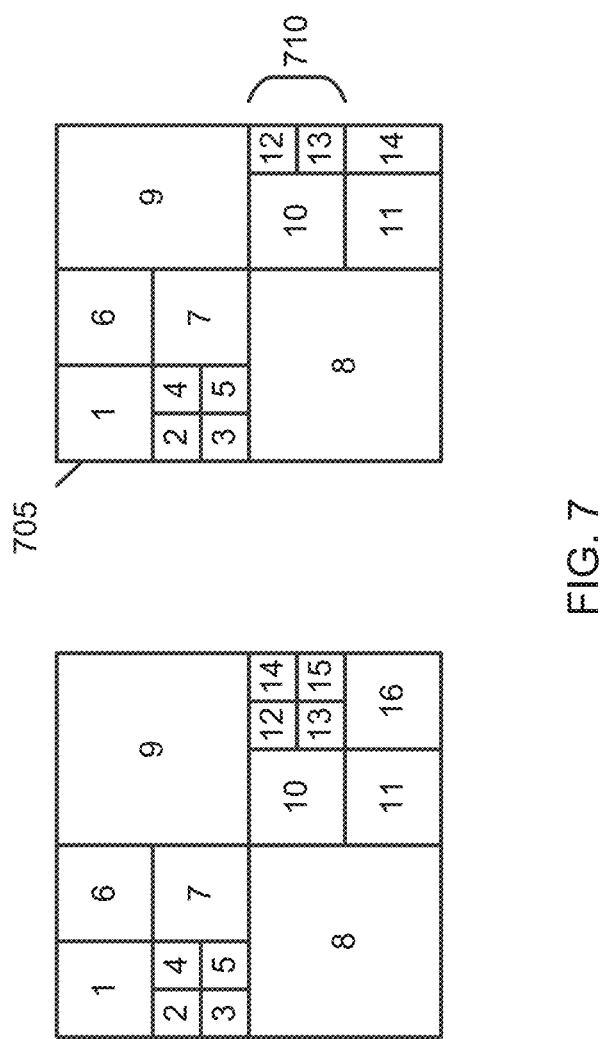
FIG. 7 is a diagram of two examples of an adaptive CTU3D/3D coding unit (CU3D) partition using a raster scan at a vertical direction, according to embodiments.

As shown in FIG. 7, for a CTU3D 705, at the right and/or bottom of a tensor, a parent CU3D node 710 at a given depth may not have all 4 child nodes. For the CU3D 710 that is located at the right and/or bottom of a tensor, cu3d_height is a remainder of max_ctu3d_height/max_cu3d_height, and cu3d_width is a remainder of max_ctu3d_width/max_cu3d_width.

In further embodiments, a Rate-Distortion (RD) based encoding algorithm is used to decide whether a parent CU3D is split to multiple smaller child CU3Ds. The parent CU3D is split to the multiple smaller child CU3Ds if a combined RD of these smaller child CU3Ds is smaller than a RD from the parent CU3D. Otherwise, the parent CU3D is not split. A split flag is defined to record this splitting decision.

An example of a corresponding syntax table is listed below in Tables 6 and 7:

TABLE 6

```
ctu3d(...) {
    ......
    cu3d(0,0,0)
    ......
}
```

TABLE 7

```
cu3d(depth,y_idx,x_idx){
    ......
    if(cu3d does not exist)
        return
    if(depth<ctu3d_depth-1){
        split_flag
        if(split_flag){
            cu3d(depth+1,(y_idx<<1),(x_idx<<1))
            cu3d(depth+1,(y_idx<<1)+1,(x_idx<<1))
            cu3d(depth+1,(y_idx<<1),(x_idx<<1)+1)
            cu3d(depth+1,(y_idx<<1)+1,(x_idx<<1)+1)
            return
        }
    }
    ......
}
``` split_flag is a flag to indicate if a parent CU3D is split to 4 smaller child CU3Ds.

Figure 8:
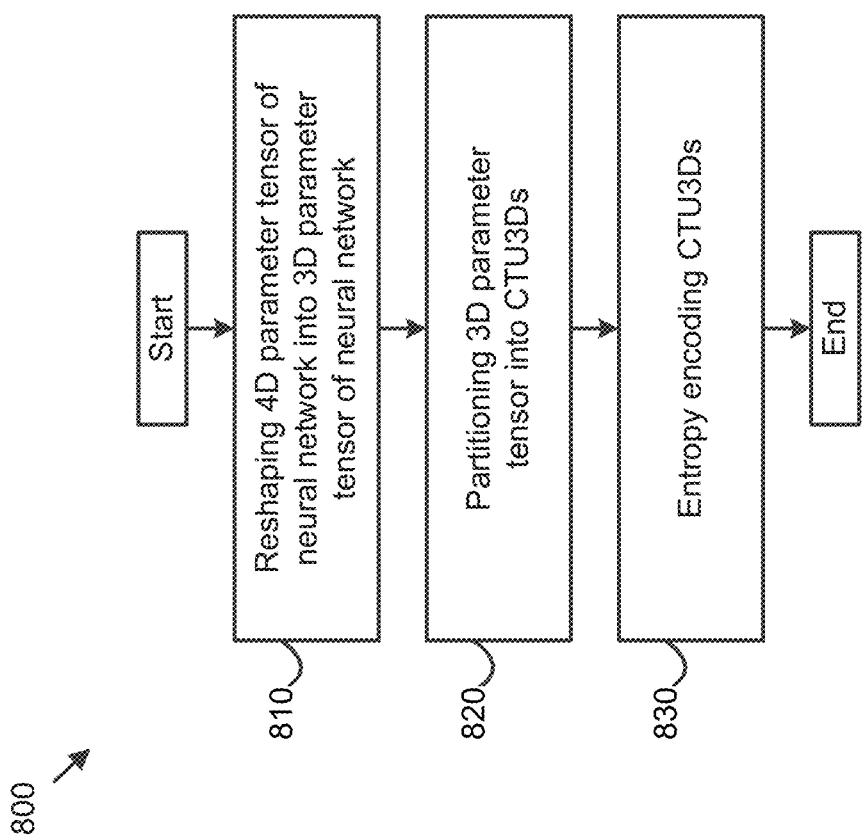
FIG. 8 is a flowchart of a method of adaptive block partitioning for neural network model compression, according to embodiments.

FIG. 8 is a flowchart of a method 800 of adaptive block partitioning for neural network model compression, according to embodiments. In some implementations, one or more process blocks of FIG. 8 may be performed by the platform 220. In some implementations, one or more process blocks of FIG. 8 may be performed by another device or a group of devices separate from or including the platform 220, such as the user device 210.

As shown in FIG. 8, in operation 810, the method 800 includes reshaping a four-dimensional (4D) parameter tensor of a neural network into a three-dimensional (3D) parameter tensor of the neural network, the 3D parameter tensor comprising a convolution kernel size, an input feature size and an output feature size.

In operation 820, the method 800 includes partitioning the 3D parameter tensor along a plane that is formed by the input feature size and the output feature size, into 3D coding tree units (CTU3Ds).

In operation 830, the method 800 includes entropy encoding the CTU3Ds.

The CTU3Ds may be non-overlapping square blocks.

The method 800 may further include setting a flag to indicate that each of the CTU3Ds has a constant size. The partitioning the 3D parameter tensor may include, based on the flag being set to indicate that each of the CTU3Ds has the constant size, partitioning the 3D parameter tensor along the plane, into the CTU3Ds having the constant size.

The method 800 may further include setting a flag to indicate that each of the CTU3Ds has a size that is scaled based on the convolution kernel size. The partitioning the 3D parameter tensor may include, based on the flag being set to indicate that each of the CTU3Ds has the size scaled based on the convolution kernel size, partitioning the 3D parameter tensor along the plane, into the CTU3Ds having the size scaled based on the convolution kernel size.

The entropy encoding the CTU3Ds may include entropy encoding the CTU3Ds in a raster scan order at either a horizontal direction or a vertical direction.

The method 800 may further include partitioning each of the CTU3Ds into a plurality of 3D coding units (CU3Ds) recursively until a maximum depth, using a quad-tree.

The entropy encoding the CTU3Ds may include scanning a first depth of the quad-tree, and entropy encoding one or more of the plurality of CU3Ds included in the scanned first depth of the quad-tree, in a raster scan order at either a horizontal direction or a vertical direction.

The plurality of CU3Ds may be non-overlapping square blocks.

The partitioning each of the CTU3Ds into the plurality of CU3Ds may include determining whether a combined rate distortion of child CU3Ds is less than a rate distortion of a parent CU3D among the plurality of CU3Ds, and based on the combined rate distortion of the child CU3Ds being determined to be less than the rate distortion of the parent CU3D, partitioning the parent CU3D into the child CU3Ds.

Although FIG. 8 shows example blocks of the method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel.

Figure 9:
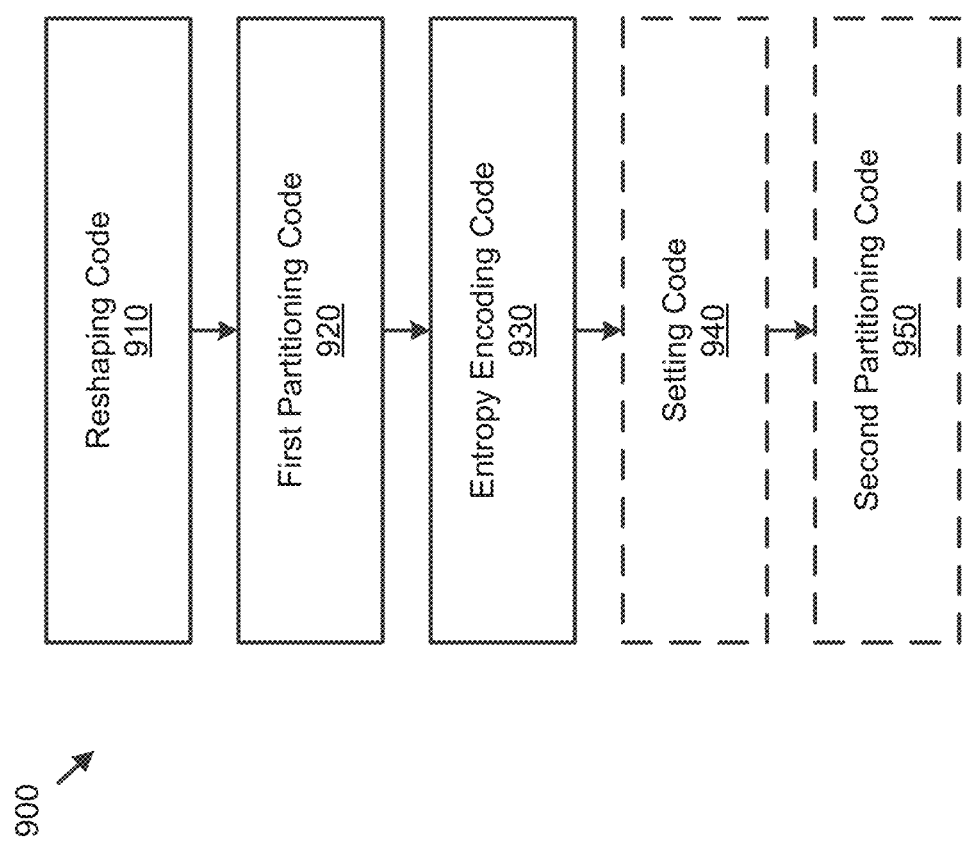
FIG. 9 is a block diagram of an apparatus for adaptive block partitioning for neural network model compression, according to embodiments.

FIG. 9 is a diagram of an apparatus 900 for adaptive block partitioning for neural network model compression, according to embodiments. As shown in FIG. 9, the apparatus 900 includes reshaping code 910, first partitioning code 920 and entropy encoding code 930.

The reshaping code 910 is configured to cause at least one processor of the apparatus 900 to reshape a four-dimensional (4D) parameter tensor of a neural network into a three-dimensional (3D) parameter tensor of the neural network, the 3D parameter tensor including a convolution kernel size, an input feature size and an output feature size.

The first partitioning code 920 is configured to cause the at least one processor to partition the 3D parameter tensor along a plane that is formed by the input feature size and the output feature size, into 3D coding tree units (CTU3Ds).

The entropy encoding code 930 is configured to cause the at least one processor to entropy encode the CTU3Ds.

The CTU3Ds may be non-overlapping square blocks.

The apparatus 900 may further include setting code 940 configured to cause the at least one processor to set a flag to indicate that each of the CTU3Ds has a constant size. The first partitioning code 920 may be further configured to cause the at least one processor to, based on the flag being set to indicate that each of the CTU3Ds has the constant size, partition the 3D parameter tensor along the plane, into the CTU3Ds having the constant size.

The setting code 940 may be further configured to cause the at least one processor to set a flag to indicate that each of the CTU3Ds has a size that is scaled based on the convolution kernel size. The first partitioning code 920 may be further configured to cause the at least one processor to, based on the flag being set to indicate that each of the CTU3Ds has the size scaled based on the convolution kernel size, partition the 3D parameter tensor along the plane, into the CTU3Ds having the size scaled based on the convolution kernel size.

The entropy encoding code 930 may be further configured to cause the at least one processor to entropy encode the CTU3Ds in a raster scan order at either a horizontal direction or a vertical direction.

The apparatus 900 may further include second partitioning code 950 configured to cause the at least one processor to partition each of the CTU3Ds into a plurality of 3D coding units (CU3Ds) recursively until a maximum depth, using a quad-tree.

The entropy encoding code 930 may be further configured to cause the at least one processor to scan a first depth of the quad-tree, and entropy encode one or more of the plurality of CU3Ds included in the scanned first depth of the quad-tree, in a raster scan order at either a horizontal direction or a vertical direction.

The plurality of CU3Ds may be non-overlapping square blocks.

The second partitioning code 950 may be further configured to cause the at least one processor to determine whether a combined rate distortion of child CU3Ds is less than a rate distortion of a parent CU3D among the plurality of CU3Ds, and based on the combined rate distortion of the child CU3Ds being determined to be less than the rate distortion of the parent CU3D, partition the parent CU3D into the child CU3Ds.

Methods and apparatuses for codebook coding for neural network model compression will now be described in detail.

A codebook is used to re-index quantized weight coefficients for CU3D.

In an embodiment, a K-means method is utilized to generate a codebook with a size of K.

In another embodiment, a histogram-based method is utilized to generate a codebook. A codebook predictor with a size of max predictor size is defined to store a codebook entry that is generated from previous codebooks. A histogram of quantized coefficients is generated. Optionally, neighbour histogram bins can be combined together. Optionally, histogram bins with small frequency counts can also be removed. A quantized bin centroid is compared with all entries in a predictor using an RD-based method, and this centroid is replaced by an entry in the predictor if a better RD is obtained using the entry in the predictor. This step is repeated until all histogram bins are processed. A maximum codebook size is defined as max_codebook_size. If a number of the bins (K) is smaller than the maximum codebook size max_codebook_size, K bin centroids are selected as the codebook; otherwise, a first maximum codebook size max_codebook_size of bin centroids are selected as the codebook. In the codebook, entries that are obtained from a predictor are placed at a beginning of the codebook, followed by entries that are not obtained from predictor.

The codebook predictor is updated after this CU3D is processed, and a codebook mode is selected as a coding mode. In an embodiment, a codebook predictor is replaced by a current codebook. In another embodiment, duplicated centroids between a codebook and a predictor are removed from the predictor, then the codebook is inserted to a front of the predictor. If a total size of the new predictor is bigger than a size max_predictor_size, only first entries of the size max_predictor_size are kept, and remaining entries are removed from the predictor; otherwise, all entries are kept as the predictor.

Figure 10:
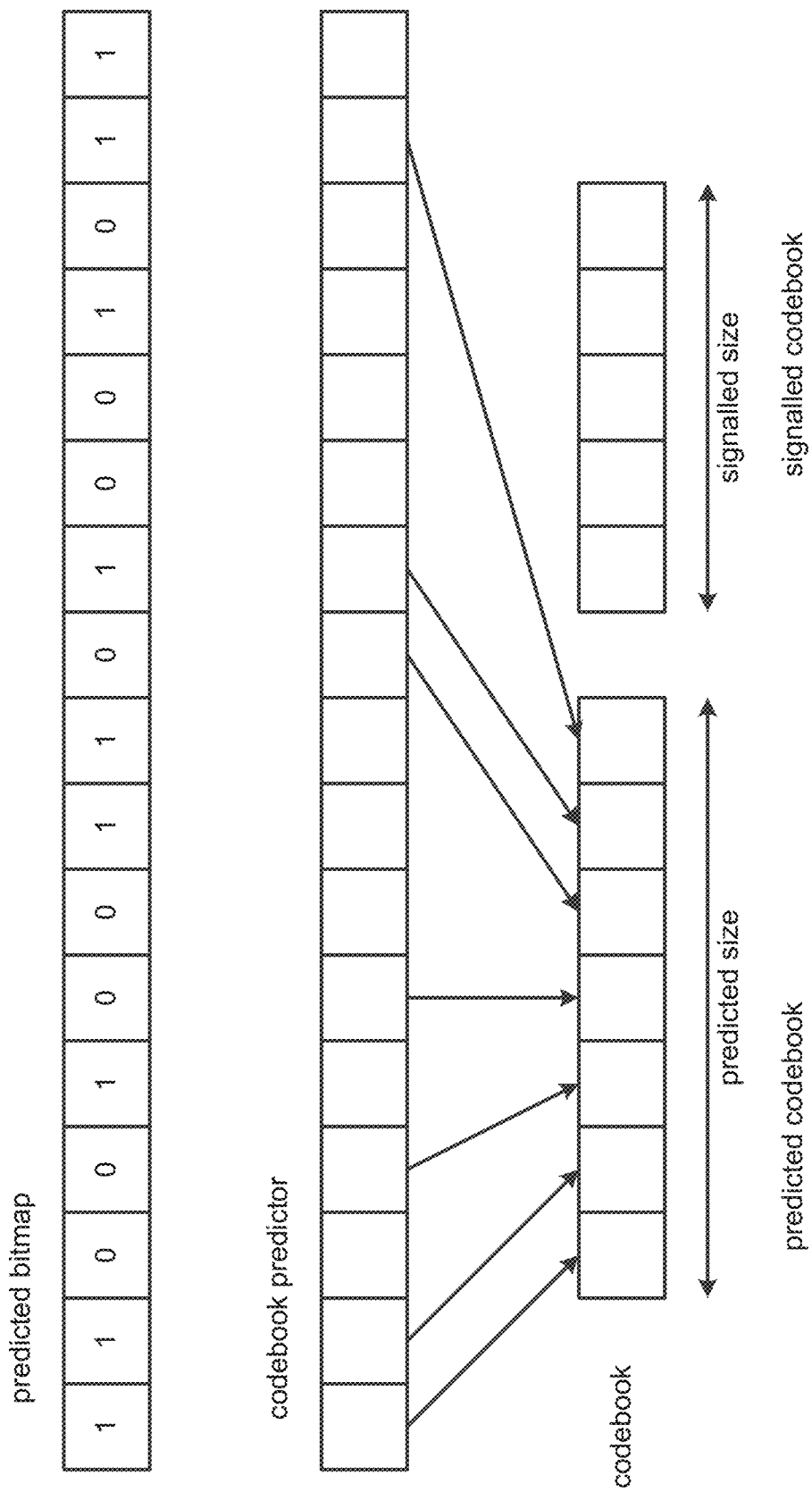
FIG. 10 is a diagram of a codebook, a codebook predictor and a predicted map, according to embodiments.

Referring to FIG. 10, predicted codebook entries are entries that are obtained from the predictor. A size of a predicted codebook entry (predicted size) is encoded in a bitstream. In an embodiment, the size predicted_size is treated as a syntax element and encoded directly in the bitstream. An absolute value is encoded first, followed by a sign value when the absolute value is not equal to zero. In another embodiment, the size predicted_size from a previous processed codebook is used as an offset, and a difference between a current size predicted_size and a previous size predicted_size is treated as the syntax element and encoded in the bitstream. An absolute value of the difference is encoded first, followed by a sign value when the absolute value is not equal to zero. In still another embodiment, a size from a previously-processed codebook (codebook size) is used as an offset, and a difference between a current size predicted_size and a previous size of the previously-processed codebook (codebook size) is treated as the syntax element and is encoded in the bitstream. An absolute value of the difference is encoded first, followed by a sign value when the absolute value is not equal to zero.

As shown in FIG. 10, in an embodiment, a bitmap array with a size of max_predictor_size (predicted bitmap[max_predictor_size]) is defined in which predicted_bitmap[n]=0 indicates that an entry n of a codebook predictor is in a codebook, and predicted_bitmap[n]=1 indicates that the entry n of the codebook predictor is not in the codebook. Starting from a first element, content of a predict bitmap (predicted bitmap) is encoded in a bitstream one by one, until a last 0 is encoded. Remaining elements may always be 1 so they are not encoded in the bitstream.

In another embodiment, a bitmap array with a size of max_predictor_size (predicted bitmap[max_predictor_size]) is defined in which predicted_bitmap[n]=1 indicates that an entry n of a codebook predictor is in a codebook, pand redicted bitmap[n]=0 indicates that the entry n of the codebook predictor is not in the codebook. Starting from a first element, content of a predicted bitmap (predicted bitmap) is encoded in a bitstream one by one, until a last 1 is encoded. Remaining elements may always be 0 so they are not encoded in the bitstream.

An example of a corresponding syntax table is listed below in Table 8:

TABLE 8

```
predicted_codebook( ) {
    abs_predicted_diff
    if(abs_predicted_diff)
        sign
    predicted_size=(sign?-int(abs_predicted_diff):
    abs_predicted_diff)+prev_predicted_size
        for(p=0,n=0;n<max_predictor_size;++n) {
            predicted_flag
            if(predicted_flag) {
                predicted[p]=n
                codebook[n]=predictor[predicted[p++]]
            }
            if(p==predicted_size)
                break
        }
}
``` abs_predicted_diff is an absolute value of predicted_size−prev_predicted_size.

sign is a sign bit of predicted_size−prev_predicted_size.

predicted_flag is a flag for which 0 indicates that a location n is not a predicted entry, and 1 indicates that the location n is the predicted entry.

Referring to FIG. 10, signalled codebook entries are entries that are not obtained from a predictor. A size of a signalled codebook entry (signalled_size) is defined as a difference between a codebook size (codebook_size) and a predicted size (predicted_size), and it is encoded in a bitstream. An absolute value of the difference is encoded first, followed by a sign value when the absolute value does not equal to zero.

Content of the signalled codebook entries signaled (signalled_size) are quantized weight coefficients that can be either positive or negative or zero. There are no more than two entries having same absolute value. A delta array with a size signalled size is defined in which a delta[n] holds a difference between an absolute value of signalled[n] and an absolute value of a previously encoded codebook. In an embodiment, the previously encoded codebook for a first signalled codebook is zero. In another embodiment, the previously encoded codebook for the first signalled codebook is a last predicted codebook entry.

To encode the delta array, a significant state of delta[n] is encoded first, and if delta[n] is not equal to zero, its sign value is encoded, followed by its absolute value. The encoding of the significant state of delta[n] is skipped if an absolute value of signalled[n−1] has appeared twice in previously encoded codebook entries or previously encoded signalled codebook entries. After this, an array of a sign bit of signalled[ ] is encoded in a bitstream.

An example of a corresponding syntax table is listed below in Table 9:

TABLE 9

```
signalled_codebook( ){
    signalled_size=0
    if(predicted_size<max_codebook_size)
        signalled_size
    codebook_size=predicted_size+signalled_size
    prev=0
    for(n=predicted_size;n<codebook_size;n++){
        delta=exist=0
        if(n>=predicted_size+2)
            for(m=predicted_size;m<n;m++)
                if(abs_codebook[m]==abs_codebook[n−1])
                    exist=1
        if(exist)
            nzflag_delta=1
        else
            nzflag_delta
        if(nzflag_delta){
            sign_delta
            abs_delta
            delta=(sign_delta?−int(abs_delta):abs_delta)
        }
        abs_codebook[n]=delta+prev
        prev=abs_codebook[n]
    }
    for(n=predicted_size;n<codebook_size;n++){
        sign
        codebook[n]=(sign?−int(abs_codebook[n]):abs_codebook[n])
    }
}
``` signalled_size is a signalled codebook size.
nzflag_delta is a non-zero flag of delta.
sign_delta is a sign bit of delta.
abs_delta is an absolute value of delta.
sign is a sign bit of codebook entry.

Another example of a corresponding syntax table is listed below in Table 10:

TABLE 10

```
signalled_codebook( ){
    signalled_size=0
    if(predicted_size<max_codebook_size)
        signalled_size
    codebook_size=predicted_size+signalled_size
    prev=0
    prev=(predicted_size)?abs(codebook[predicted_size−1]):0
    for(n=predicted_size;n<codebook_size;n++){
        delta=exist=0
        if(n+predicted_size>=2)
            for(m=0;m<n;m++)
                if(abs_codebook[m]==abs_codebook[n−1])
                    exist=1
```

TABLE 10-continued

```
        if(exist)
            nzflag_delta=1
        else
            nzflag_delta
        if(nzflag_delta){
            sign_delta
            abs_delta
            delta=(sign_delta?−int(abs_delta):abs_delta)
        }
        abs_codebook[n]=delta+prev
        prev=abs_codebook[n]
    }
    for(n=predicted_size;n<codebook_size;n++){
        sign
        codebook[n]=(sign?−int(abs_codebook[n]):abs_codebook[n])
    }
}
```

In an embodiment, for every quantized weight coefficient (Q) in CU3D, an absolute difference between the respective quantized weight coefficient Q and all codebook entries are calculated, and a codebook index (n) corresponding to the smallest absolute difference is selected as an codebook index of the respective quantized weight coefficient Q. An index map of this CU3D is constructed using all codebook indices of weight coefficients.

In another embodiment, for every quantized weight coefficient (Q) in CU3D, an absolute difference between the respective quantized weight coefficient Q and all codebook entries are calculated, the a codebook index (n) corresponding to the smallest absolute difference is selected for an additional RD calculation (rd_codebook). An RD (rd_escape) of coding this quantized weight coefficient is also calculated. If the additional RD calculation (rd_codebook) is smaller than the RD (rd_escape), this codebook index (n) is selected as the codebook index of the respective quantized weight coefficient Q. Otherwise, a special escape index, defined as a size of a codebook, is used as the codebook index of the respective quantized weight coefficient Q. An index map of this CU3D is constructed using codebook indices and escape indices of the weight coefficients.

An encoding algorithm is applied to both quantized weight coefficients and index map coefficients, and one mode with a better RD is chosen as a winner. This mode decision is encoded implicitly in a bitstream, the mode that does not use codebook can be inferred when both a predicted size (predicted size) and a signaled size (signalled size) equal to zero.

Figure 11:
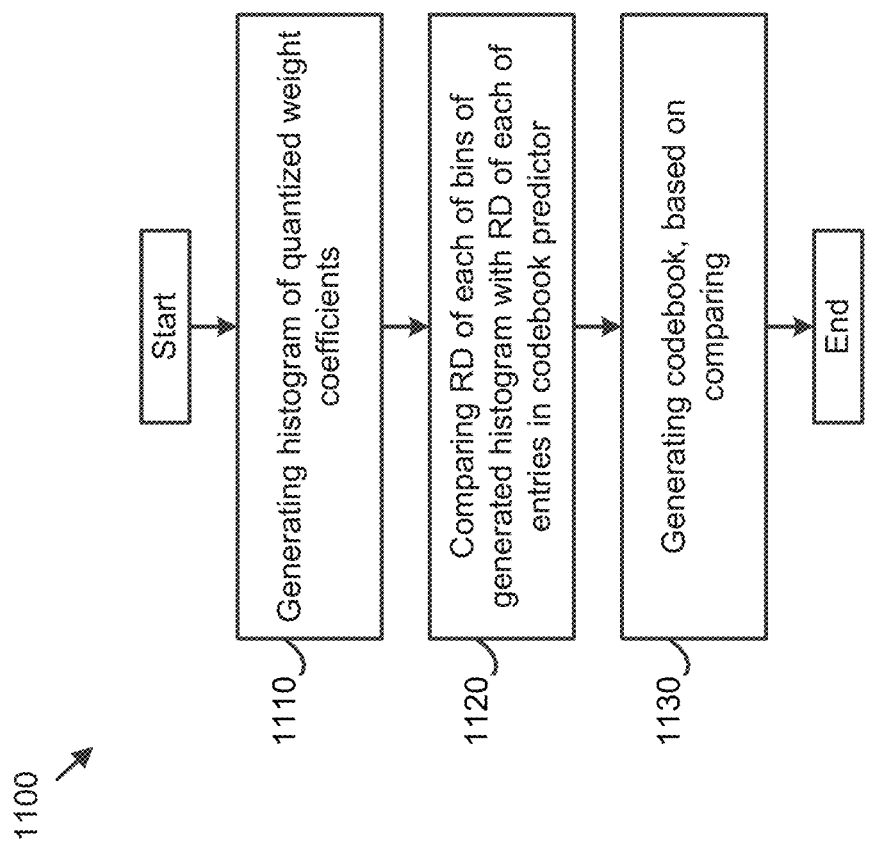
FIG. 11 is a flowchart of a method of codebook coding for neural network model compression, according to embodiments.

FIG. 11 is a flowchart of a method 1100 of codebook coding for neural network model compression, according to embodiments. In some implementations, one or more process blocks of FIG. 11 may be performed by the platform 220. In some implementations, one or more process blocks of FIG. 11 may be performed by another device or a group of devices separate from or including the platform 220, such as the user device 210.

As shown in FIG. 11, in operation 1110, the method 1100 includes generating a histogram of the quantized weight coefficients.

In operation 1120, the method 1100 includes comparing a rate distortion of each of bins of the generated histogram with a rate distortion of each of entries in a codebook predictor for the quantized weight coefficients.

In operation 1130, the method 1100 includes, based on the rate distortion of one of the bins of the histogram being compared to be less than the rate distortion of one of the entries in the codebook predictor, replacing the one of the bins with the one of the entries, to generate a codebook for re-indexing the quantized weight coefficients.

The method 1100 may further include generating a predicted bitmap indicating whether each of the entries of the codebook predictor is in the generated codebook.

Although FIG. 11 shows example blocks of the method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel.

Figure 12:
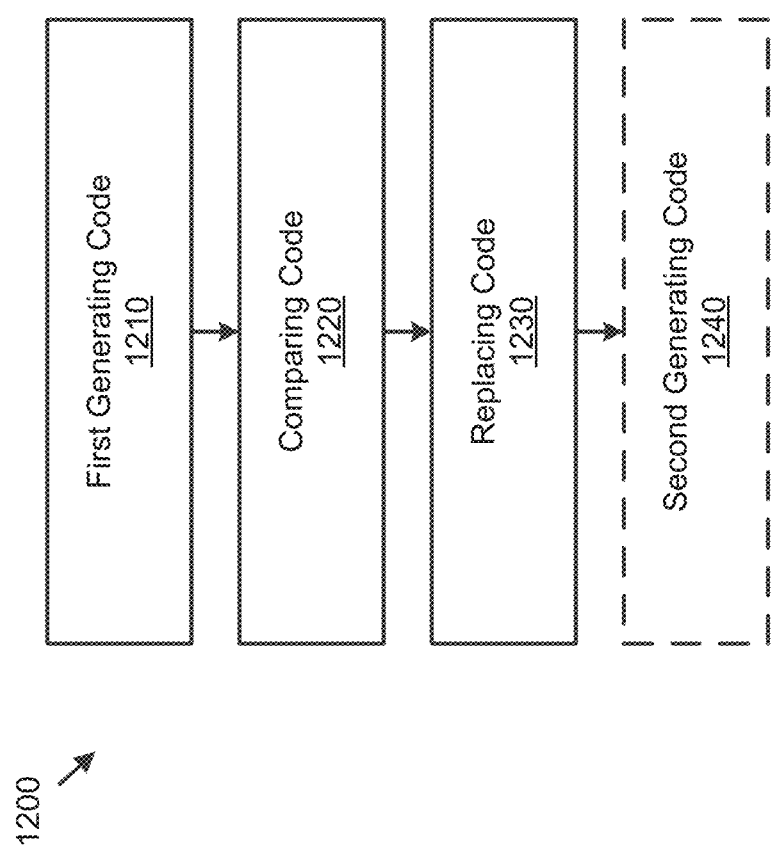
FIG. 12 is a block diagram of an apparatus for codebook coding for neural network model compression, according to embodiments.

FIG. 12 is a diagram of an apparatus 1200 for codebook coding for neural network model compression, according to embodiments. As shown in FIG. 12, the apparatus 1200 includes first generating code 1210, comparing code 1220, replacing code 1230 and second generating code 1240.

The first generating code 1210 is configured to cause at least one processor to generate a histogram of the quantized weight coefficients.

The comparing code 1220 is configured to cause the at least one processor to compare a rate distortion of each of bins of the generated histogram with a rate distortion of each of entries in a codebook predictor for the quantized weight coefficients.

The replacing code 1230 is configured to cause the at least one processor to, based on the rate distortion of one of the bins of the histogram being compared to be less than the rate distortion of one of the entries in the codebook predictor, replace the one of the bins with the one of the entries, to generate a codebook for re-indexing the quantized weight coefficients.

The second generating code 1240 is configured to cause the at least one processor to generate a predicted bitmap indicating whether each of the entries of the codebook predictor is in the generated codebook.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of quantization, adaptive block partitioning and codebook coding for neural network model compression, the method being performed by at least one processor, and the method comprising:
    determining a saturated maximum value of a multi-dimensional tensor in a layer of a neural network, and a bit depth corresponding to the saturated maximum value;
    clipping weight coefficients in the multi-dimensional tensor to be within a range of the saturated maximum value;
    quantizing the clipped weight coefficients, based on the bit depth;
    transmitting, to a decoder, a layer header comprising the bit depth and a plurality of partitioning parameters that specify at least a height threshold and a width threshold;
    reshaping a four-dimensional (4D) parameter tensor of a neural network, among the quantized weight coefficients, into a three-dimensional (3D) parameter tensor of the neural network, the 3D parameter tensor comprising a convolution kernal size, an input feature size and an output feature size; and
    partitioning the 3D parameter tensor based on the height threshold and the width threshold.

2. The method of claim 1, further comprising coding the bit depth, using a variable length coding or a fixed length coding,
    wherein the layer header comprises the coded bit depth.

3. The method of claim 1, wherein the layer header further comprises the saturated maximum value.

4. The method of claim 1,
    the height threshold is determined based on a right shift operation of a maximum height of a 3D coding tree unit (CTU3D) by the bit depth, and
    the width threshold is determined based on a right shift operation of a maximum weight of the CTU3D by the bit depth.

5. The method of claim 1, wherein the saturated maximum value is represented by a floating number,
    wherein the method further comprises determining an integer representing the saturated maximum value, based on an equation:

int_layer_sat_maxw=int(ceil(layer_sat_maxw*
        (2**N))), where int_layer_sat_maxw indicates the integer of the saturated maximum value, and layer_sat_maxw indicates the saturated maximum value.

6. The method of claim 5, further comprising coding the integer of the saturated maximum value, using a variable length coding or a fixed length coding.

7. The method of claim 1, wherein the layer header further comprises a step size of the quantizing the clipped weight coefficients.

8. The method of claim 1,
wherein the partitioning the 3D parameter tensor is performed along a plane that is formed by the input feature size and the output feature size, into 3D coding tree units (CTU3Ds); and
the method further comprising encoding the CTU3Ds.

9. The method of claim 8, wherein the CTU3Ds are non-overlapping square blocks.

10. The method of claim 8, further comprising setting a flag to indicate that each of the CTU3Ds has a constant size,
wherein the partitioning the 3D parameter tensor comprises, based on the flag being set to indicate that each of the CTU3Ds has the constant size, partitioning the 3D parameter tensor along the plane, into the CTU3Ds having the constant size.

11. The method of claim 8, further comprising setting a flag to indicate that each of the CTU3Ds has a size that is scaled based on the convolution kernel size,
wherein the partitioning the 3D parameter tensor comprises, based on the flag being set to indicate that each of the CTU3Ds has the size scaled based on the convolution kernel size, partitioning the 3D parameter tensor along the plane, into the CTU3Ds having the size scaled based on the convolution kernel size.

12. The method of claim 8, wherein the entropy encoding the CTU3Ds comprises entropy encoding the CTU3Ds in a raster scan order at either a horizontal direction or a vertical direction.

13. The method of claim 8, further comprising partitioning each of the CTU3Ds into a plurality of 3D coding units (CU3Ds) recursively until a maximum depth, using a quad-tree.

14. The method of claim 13, wherein the entropy encoding the CTU3Ds comprises:
scanning a first depth of the quad-tree; and
entropy encoding one or more of the plurality of CU3Ds included in the scanned first depth of the quad-tree, in a raster scan order at either a horizontal direction or a vertical direction.

15. The method of claim 13, wherein the plurality of CU3Ds are non-overlapping square blocks.

16. The method of claim 13, wherein the partitioning each of the CTU3Ds into the plurality of CU3Ds comprises:
determining whether a combined rate distortion of child CU3Ds is less than a rate distortion of a parent CU3D among the plurality of CU3Ds; and
based on the combined rate distortion of the child CU3Ds being determined to be less than the rate distortion of the parent CU3D, partitioning the parent CU3D into the child CU3Ds.

17. The method of claim 1, further comprising:
generating a histogram of the quantized weight coefficients;
comparing a rate distortion of each of bins of the generated histogram with a rate distortion of each of entries in a codebook predictor for the quantized weight coefficients; and
based on the rate distortion of one of the bins of the histogram being compared to be less than the rate distortion of one of the entries in the codebook predictor, replacing the one of the bins with the one of the entries, to generate a codebook for re-indexing the quantized weight coefficients.

18. The method of claim 17, further comprising a predicted bitmap indicating whether each of the entries of the codebook predictor is in the generated codebook.

19. An apparatus for quantization, adaptive block partitioning and codebook coding for neural network model compression, the apparatus comprising:
at least one memory configured to store program code; and
at least one processor configured to read the program code and operate as instructed by the program code, the program code comprising:
first determining code configured to cause the at least one processor to determine a saturated maximum value of a multi-dimensional tensor in a layer of a neural network, and a bit depth corresponding to the saturated maximum value;
clipping code configured to cause the at least one processor to clip weight coefficients in the multi-dimensional tensor to be within a range of the saturated maximum value;
quantizing code configured to cause the at least one processor to quantize the clipped weight coefficients, based on the bit depth;
transmitting code configured to cause the at least one processor to transmit, to a decoder, a layer header comprising the bit depth and a plurality of partitioning parameters that specify at least a height threshold and a width threshold;
reshaping code configured to cause the at least one processor to reshape a four-dimensional (4D) parameter tensor of a neural network, among the quantized weight coefficients, into a three-dimensional (3D) parameter tensor of the neural network, the 3D parameter tensor comprising a convolution kernel size, an input feature size and an output feature size; and
partitioning the 3D parameter tensor based on the height threshold and the width threshold.

20. A non-transitory computer-readable medium storing instructions that, when executed by at least one processor for quantization, adaptive block partitioning and codebook coding for neural network model compression, cause the at least one processor to:
determine a saturated maximum value of a multi-dimensional tensor in a layer of a neural network, and a bit depth corresponding to the saturated maximum value;
clip weight coefficients in the multi-dimensional tensor to be within a range of the saturated maximum value;
quantize the clipped weight coefficients, based on the bit depth;
transmit, to a decoder, a layer header comprising the bit depth and a plurality of partitioning parameters that specify at least a height threshold and a width threshold;
reshape a four-dimensional (4D) parameter tensor of a neural network, among the quantized weight coefficients, into a three-dimensional (3D) parameter tensor of the neural network, the 3D parameter tensor comprising a convolution kernel size, an input feature size and an output feature size; and
partitioning the 3D parameter tensor based on the height threshold and the width threshold.

* * * * *